US006915053B2

United States Patent
Hasegawa

(10) Patent No.: US 6,915,053 B2
(45) Date of Patent: Jul. 5, 2005

(54) MICROSTRUCTURED OPTICAL FIBER AND OPTICAL MODULE

(75) Inventor: Takemi Hasegawa, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 218 days.

(21) Appl. No.: 10/417,141

(22) Filed: Apr. 17, 2003

(65) Prior Publication Data

US 2004/0105640 A1 Jun. 3, 2004

(30) Foreign Application Priority Data

Nov. 28, 2002 (JP) ........................................ 2002-346189

(51) Int. Cl.⁷ ................................................. G02B 6/02
(52) U.S. Cl. ........................ 385/124; 385/123; 385/125
(58) Field of Search ................................ 385/124, 123, 385/125, 126, 127

(56) References Cited

U.S. PATENT DOCUMENTS

| 5,802,236 | A | 9/1998 | DiGiovanni | |
|---|---|---|---|---|
| 6,400,866 | B2 | 6/2002 | Ranka et al. | |
| 6,684,018 | B2 * | 1/2004 | Arai et al. | 385/127 |
| 6,766,089 | B2 * | 7/2004 | Arai et al. | 385/123 |
| 6,813,430 | B2 * | 11/2004 | Aikawa et al. | 385/127 |
| 2002/0102085 | A1 * | 8/2002 | Arai et al. | 385/127 |
| 2002/0174689 | A1 * | 11/2002 | Onishi et al. | 65/378 |
| 2004/0062500 | A1 * | 4/2004 | Arai et al. | 385/127 |

FOREIGN PATENT DOCUMENTS

| WO | WO 00/49435 | 8/2000 |
|---|---|---|
| WO | WO 02/39161 A1 | 5/2002 |
| WO | WO 02/42814 A | 5/2002 |
| WO | WO 02/084350 | 10/2002 |

OTHER PUBLICATIONS

'Designing the properties of dispersion flattened photonic crystal fibers', Ferrando et al., Optics Express, Dec. 2001, vol. 9, No. 13, PP 687–697.*

Ortigosa–Blanch, A., et al. "Highly birefingent photonic crystal fibers." Optical Society If America, 2000, pp. 1325–1327.

(Continued)

Primary Examiner—K. Cyrus Kianni
(74) Attorney, Agent, or Firm—McDermott Will & Emery LLP

(57) ABSTRACT

A microstructured optical fiber is structured with a core region and a plurality of cladding regions surrounding the core region. Chromatic dispersion is relatively flat over a broad wavelength range with a small effective area, without need for air holes that are unacceptably small. An enlarged effective core area is obtained by selectively closing the holes in the innermost cladding, which holes are smaller and easier to close than the holes in other regions.

13 Claims, 6 Drawing Sheets

OTHER PUBLICATIONS

"Designing the properties of dispersion–flattened photonic crystal fibers", Ferrando, et al., Optics Express, Dec. 17, 2001, vol. 9, No. 13, pp. 688–697.

"Photonic Crystal Fibres: An Endless Variety", Birks, et al., IEICE Trans. Electron., vol. E84–C, No. 5, May 2001, p. 585–592.

"Dispersion–flattened fiber for efficient supercontinuum generation", Taccheo, et al., OFC 2002, Thursday Afternoon, pp. 565–567.

"Analysis of Optical Regeneration Utilizing Self–Phase Modulation in a Highly–Nonlinear Fiber", Matsumoto, et al., IEEE Photonics Technology Letters, vol. 14, No. 3, Mar. 2002, pp. 319–321.

"Broadband fiber optical parametric amplifiers", Marhic, et al., Optics Letters, Apr. 15, 1996, vol. 21, No. 8, pp. 573–575.

"Nonlinear Fiber Optics", Agrawal, Quantum Electronics—Principles and Applications, 1989, pp. 292–295, ISBN 0–12–045140–9.

"Wave Theory of Uniform–Core Fibers", Okoshi, Optical Fibers, 1982, pp. 52–71.

"All–Optical Data Regeneration Based on Self–Phase Modulation Effect", Mamyshev, ECOC '98, Madrid, Spain, Sep. 20–24, 1998, pp. 475–576.

\* cited by examiner

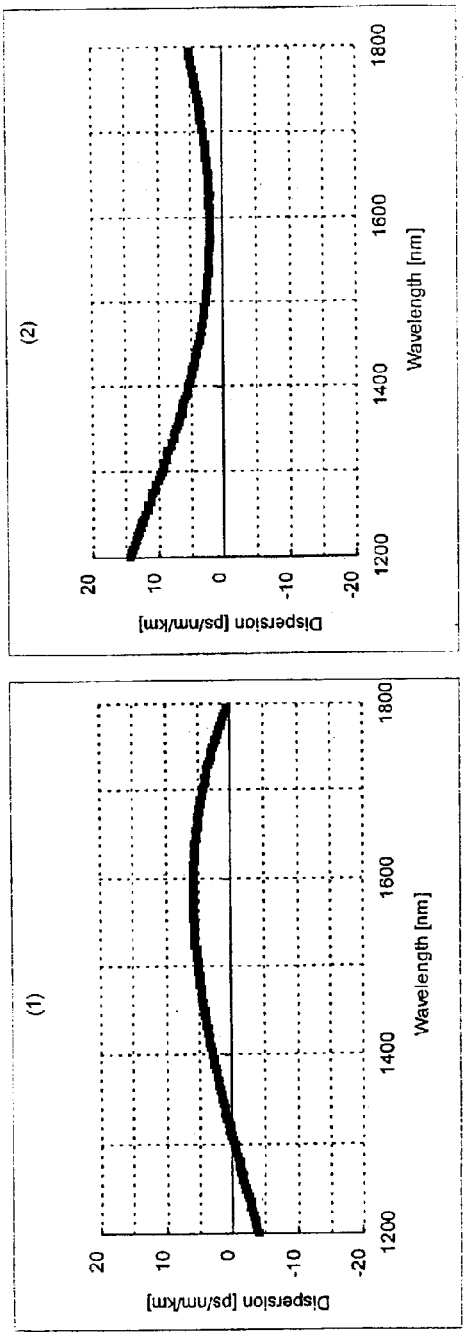
FIG. 2
FIG. 5
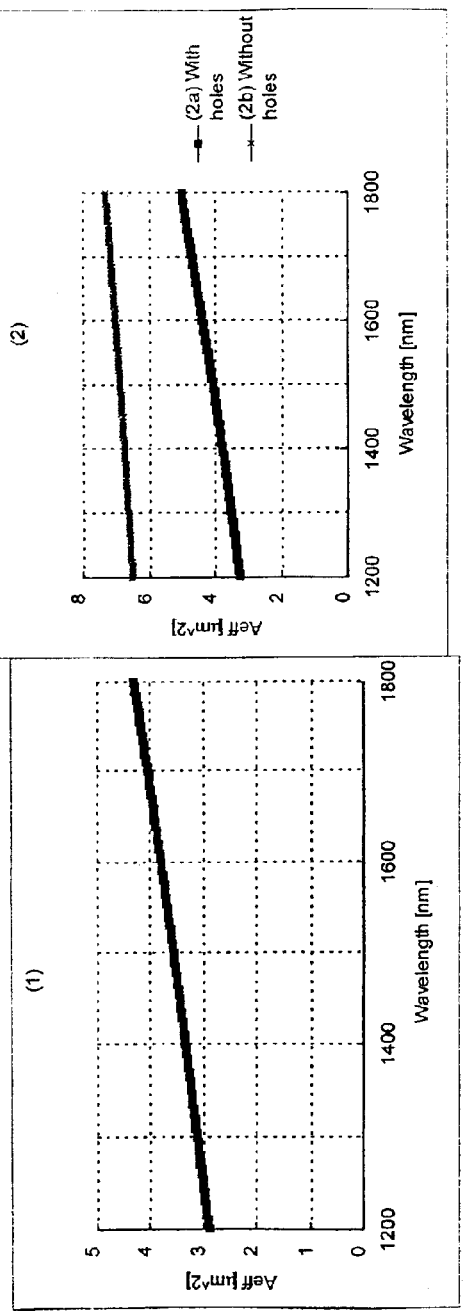
FIG. 3
FIG. 6

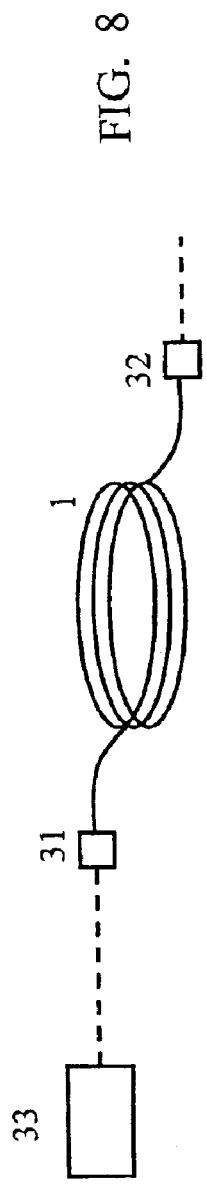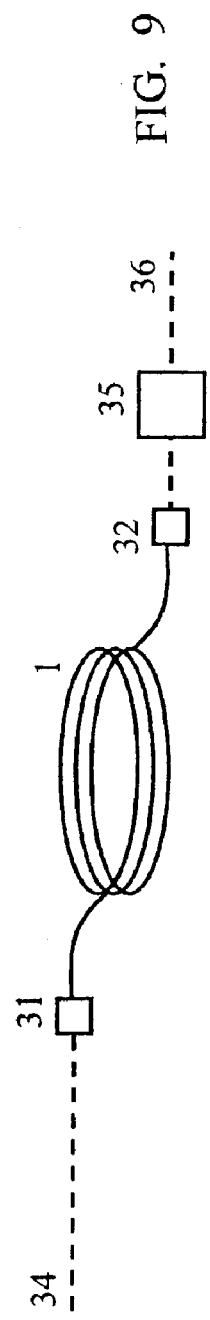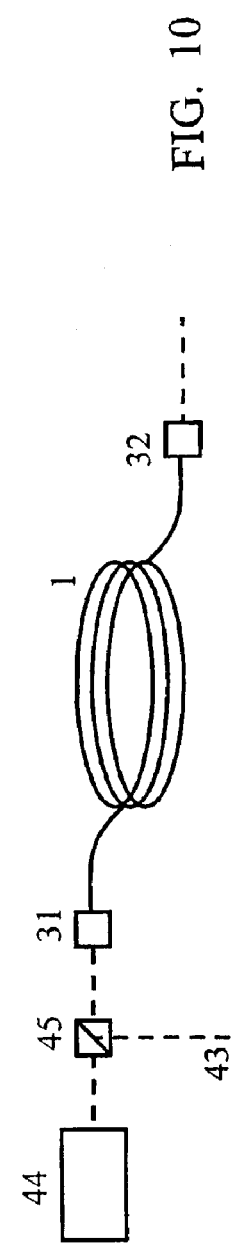

MICROSTRUCTURED OPTICAL FIBER AND OPTICAL MODULE

FIELD OF THE INVENTION

The present invention relates to microstructured optical fibers, more particularly to such optical fibers that realize flat dispersion and small effective core areas.

BACKGROUND

The recent development of the microstructured optical fiber, in which a high index core region is surrounded by cladding having a mix of silica and air, offers new fiber properties by virtue of the large refractive-index contrast that exists between glass and air. Appropriate design of microstructured optical fiber can realize flat dispersion characteristics. For example, as described in *Designing the properties of dispersion-flattened photonic crystal fibers*, Ferrando et al., OPTICS EXPRESS pp. 687–697 (2001), it is possible to realize dispersion characteristic $D(\lambda)$ satisfying:

$$\max_{\lambda \in \Omega}[D(\lambda)] - \min_{\lambda \in \Omega}[D(\lambda)] \leq \Delta D, \text{ and } \min_{\lambda \in \Omega}[D(\lambda)] < D_0 < \max_{\lambda \in \Omega}[D(\lambda)],$$

in a wavelength range $\Omega = \{\lambda | \lambda_1 \leq \lambda_2\}$ where $\lambda_1 = 1.3$ [$\mu$m], $\lambda_2 = 1.8$ [$\mu$m], $\lambda_2 - \lambda_1 = 523$ [nm], $\Delta D = 2$ [ps/nm/km], and $D_0 = 0$ [ps/nm/km]. Such a characteristic is obtained in a structure where the radius and the pitch of the air hole are 0.316 $\mu$m and 2.62 $\mu$m, respectively.

An optical fiber having several air holes running along the fiber length, known as a "holey fiber", or "photonic crystal fiber" is described in a paper entitled Photonic Crystal Fibres: An Endless Variety, T. A. Birks et al., IEICE Trans. Electron., V. E84-C, pp.585–592 (2001). Such fiber is also disclosed in International PCT application WO 02/39161. Dispersion tuning holes are arranged laterally displaced from the geometrical axis of optical fiber, by a distance of at least half the core radius. Provision of such additional dispersion tuning holes can be used to tune the fiber dispersion independently from the other modal properties such as the mode shape, the mode field diameter, and the effective core area. In one embodiment, the dispersion tuning holes have a cross-sectional width of less than approximately one-tenth or one-sixth of the predetermined wavelength.

An optical fiber having a flat dispersion and a small effective core area is desirable for applications such as supercontinuum light generation, optical pulse reshaping, and optical parametric amplification. In optical communication, attenuation, distortion, and timing jitter are imposed on optical signal pulses during their travel over the optical fibers and components. Supercontinuum light generation is a nonlinear optical phenomenon in which an optical pulse with relatively high power and relatively short duration is launched into a nonlinear medium and the spectrum of the pulse is broadened because of nonlinear optical phenomena and chromatic dispersion, as described in *Dispersion-flattened fiber for efficient supercontinuum generation*, S. Taccheo and P. Vavassori, OFC 2002, ThY5 (2002). Optical parametric amplification is an optical amplification that is caused by higher order (usually third) nonlinear susceptibility and occurs when a phase matching condition is satisfied between the lightwaves participating in the process, as described in *Broadband fiber optical parametric amplifiers*, M. E. Marhic et al., Opt. Lett. V. 21, pp. 573–575 (1996). In optical communication, attenuation, distortion, and timing jitter are imposed on an optical signal pulse during their travel over the optical fibers and components. Operations to remove the influences of the attenuation, distortion, and timing jitter are respectively called regeneration, reshaping, and retiming, as described in *Analysis of Optical Regeneration Utilizing Self-Phase Modulation in a Highly Nonlinear Fiber*, M. Matsumoto, Photon. Tech. Lett. V. 14, pp. 319–321 (2002).

The need thus exists in the prior art for the simultaneous realization of a flat dispersion and a small effective core area in microstructured fibers. Although a flat dispersion is disclosed in the above referenced Ferrando paper, the effective core area is calculated to be 36 $\mu$m$^2$ in the structure having a hole radius of 0.316 $\mu$m and a pitch of 2.62 $\mu$m. Although the referenced prior art discloses a way to adjust chromatic dispersion independently from effective core area, it does not disclose the capability to realize a flat dispersion and a small effective core area.

In the referenced prior art structures, it is difficult to realize a low transmission loss, a high durability against UV light, and a high yield in the fiber-drawing process. In order to draw a microstructured fiber with stable quality, it is necessary to keep the furnace temperature low, or equivalently the drawing tension high, because the influence of surface tension, which causes the air holes to shrink, decreases with the decrease in temperature. However, drawing a fiber with a high tension often results in fiber breaking during drawing or structural defects in the glass of the drawn fiber. Instances of fiber breaking lower the yield of production. Glass structural defects cause excess losses in UV wavelength and increased loss due to exposure to UV light. Since the influence of surface tension increases in proportion to the inverse of the curvature radii of air holes, higher tension is necessary as the air holes become smaller. In the prior art disclosures, in which dispersion-tuning holes is as small as or less than 1/6 to 1/10 of wavelength, extremely high drawing tension is necessary, resulting in a low durability against UV light and a low yield of production.

SUMMARY OF THE INVENTION

The present invention fulfills the above described fiber characteristic needs, while overcoming the drawbacks of the prior art, at least in part, by provision of fiber in which chromatic dispersion is flat over a broad wavelength range with a small effective area, without need for air holes that are unacceptably small. Further, the present invention provides an enlarged effective core area by selectively closing the holes in the first cladding, which holes are smaller and easier to close than the holes in the other regions.

The following terms are defined to aid description of microstructured fiber characteristics.

A main medium is a medium that can constitute an optical fiber by itself. On the other hand, a sub medium is not necessarily able to constitute an optical fiber by itself. For example, glasses and polymers can be used as a main medium or a sub medium, while liquids, gases and vacuum can be used as a sub medium but not a main medium.

The average refractive index of a region composed of several media i (i=1 . . . M) is defined by the following formulas:

$$n_{avg} = \left\{ \left( \sum_{i=1}^{M} n^2[i] f[i] \right) \bigg/ \left( \sum_{i=1}^{M} f[i] \right) \right\}^{\frac{1}{2}}$$

wherein n[i] and f[i] are respectively the refractive index and the volume of medium i.

Advantages of the present invention will become readily apparent from the following detailed description, simply by way of illustration of the best mode contemplated of carrying out the invention. The invention is capable of other and different embodiments, and its several details are capable of modifications in various obvious respects, all without departing from the invention. Accordingly, the drawing and description are illustrative in nature, not restrictive.

BRIEF DESCRIPTION OF THE DRAWINGS

The present invention is illustrated by way of example, and not by way of limitation, in the figures of the accompanying drawing and in which like reference numerals refer to similar elements and in which:

FIG. 2 shows the chromatic dispersion of the fundamental mode of the optical fiber shown in FIG. 1.

FIG. 3 shows the effective core area of the fundamental mode of the optical fiber shown in FIG. 1.

FIG. 5 is a graph showing the chromatic dispersion of the fundamental mode of the optical fiber shown in FIG. 4.

FIG. 6 shows the effective core area of the fundamental mode of the optical fiber shown in FIG. 4.

FIG. 8 shows an optical module for supercontinuum generation using an optical fiber according to the present invention.

FIG. 9 shows an optical module for optical pulse reshaping using an optical fiber according to the present invention.

FIG. 10 shows an optical module for optical parametric amplification using an optical fiber according to the present invention.

DETAILED DESCRIPTION OF THE INVENTION

Figure 1:
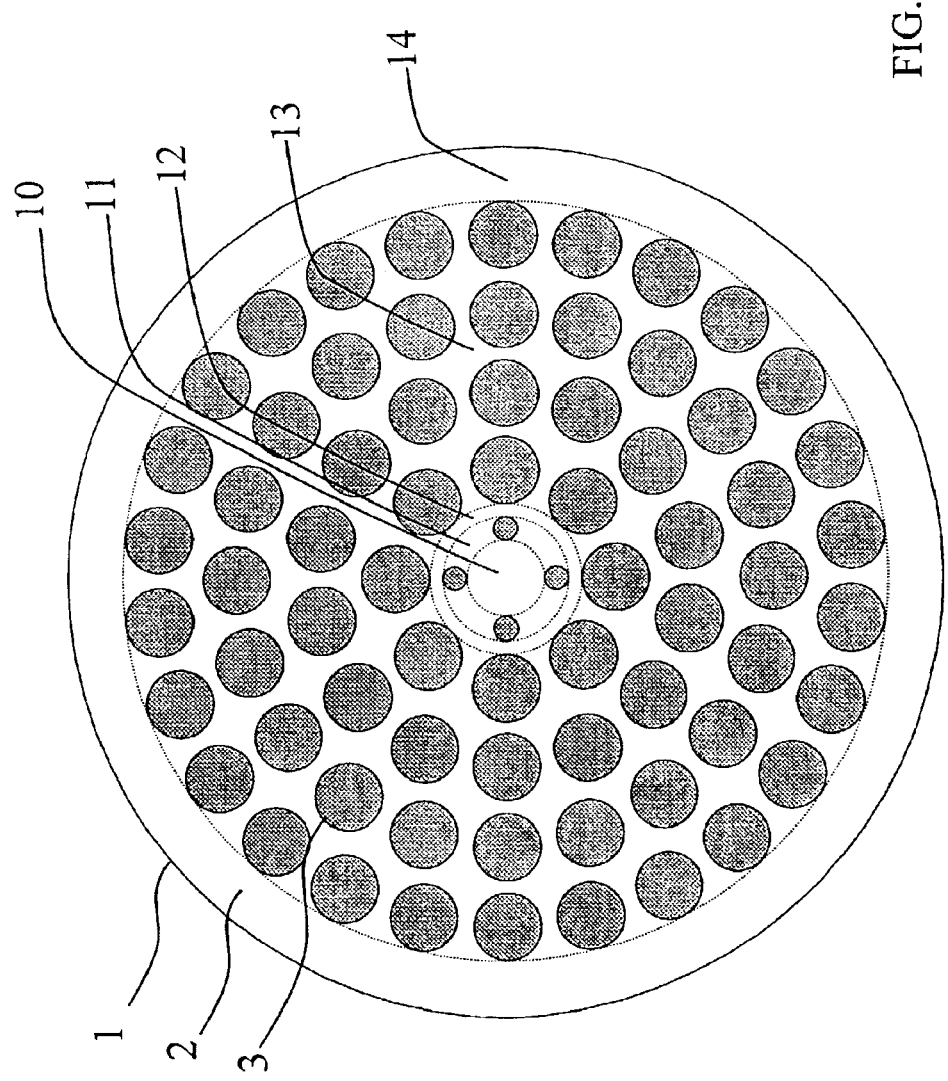
FIG. 1 is an illustration of a cross section taken perpendicular to the fiber axis of a microstructured optical fiber in accordance with the present invention.

FIG. 1 is an illustration of a cross section taken perpendicular to the fiber axis of a microstructured optical fiber in accordance with the present invention. A plurality of holes 3, which are sub media, are arranged in silica glass 2, which is a main medium. The silica glass is typically free from impurities. However, it is also favorable to add dopants such as germanium, fluorine, chlorine, boron, aluminum, and titanium to silica glass and form a refractive index profile within the cross section of the optical fiber. As a result, it becomes possible to maintain waveguiding function even if the holes are collapsed. Such collapses are often caused in fusion splices of the optical fiber with other optical components, so that optical loss at a fusion splice can be suppressed by the waveguiding index profile. Also, by adding germanium to silica glass and exposing the optical fiber to UV radiation, it becomes possible to form fiber gratings and realize optical filters and optical power equalizers. Moreover, by adding dopants such as germanium, phosphorus, nitrogen, it becomes possible to enhance the nonlinearity of the glass and thereby reduce the optical power needed to supercontinuum generation, or to modify the Raman gain spectrum and thereby realize an optical gain medium suitable for Raman amplification over a broad wavelength range. Also, by adding dopants such as erbium, ytterbium, neodymium, and praseodymium, it becomes possible to realize optical amplification characteristics. On the other hand, holes are typically filled with inert gases such as nitrogen gas, argon gas, neon gas, and helium gas at a predetermined pressure. However, it is also possible to realize optical amplification characteristics by filling holes with active gases such as hydrogen gas.

In the cross section of the fiber shown in FIG. 1, the core region 10 is a circular region not including holes. The first cladding region 11 is a ring region surrounding the core region and including four holes. The second cladding region 12 is a ring region surrounding the first cladding region and not including holes. The third cladding region 13 is a ring region surrounding the second cladding region and including sixty eight holes. The forth cladding region 14 is a ring region surrounding the third cladding region and not including holes. The outer boundary of the fourth cladding region is the outer boundary of the glass region of the optical fiber. However, it is also possible to cover the outer surface of the fourth cladding region with coating medium such as polymer, and thereby improve the mechanical strength of the optical fiber. The centers of the core and the first to fourth cladding regions coincide with the center of the optical fiber.

In the first cladding region, four holes are equidistantly arranged on the circumference of the circle centered at the center of the optical fiber and having a radius of 0.85 $\mu$m. Each of the holes has a diameter of 0.41 $\mu$m, or an area of 0.13 $\mu$m$^2$. In the third cladding, 8, 14, 20 and 26 holes are equidistantly arranged on the circumferences of the circles centered at the center of the optical fiber and having radii of 1.85 $\mu$m, 3.19 $\mu$m, 4.53 $\mu$m, and 5.88 $\mu$m, respectively. Each of the holes has a diameter of 1.13 $\mu$m. Also, because of such an arrangement, the arrangement of the holes in the first cladding and in the innermost layer of the third cladding have a rotational symmetry of the fourth order. As a result, birefringence and polarization mode dispersion are reduced.

The outer boundaries of the core region, the first, the second and the third cladding regions are circumferences of circles centered at the center of the optical fiber and having radii of 0.65 $\mu$m, 1.06 $\mu$m, 1.29 $\mu$m, and 6.45 $\mu$m, respectively. As a result, the average refractive indices of the core N[0] and the k-th cladding regions N[k] (k=1 . . . 4) are N[0]=1.444, N[1]=1.351, N[2]=1.444, N[3]=1.221, N[4]=1.444, and hence the following condition is satisfied:

$$N[0] > N[0] < N[2] > N[3].$$

The refractive indices of silica glass and hole are respectively 1.444 and 1. The values of the refractive indices are defined at a 1550 nm wavelength unless designated otherwise.

FIG. 2 shows the chromatic dispersion of the fundamental mode of the optical fiber shown in FIG. 1. The chromatic dispersion is −4.1 ps/nm/km at a wavelength of 1200 nm, and +4.1 ps/nm/km at 1700 nm. The average, standard deviation, maximum and minimum of the chromatic dispersion over a wavelength range of 1200 nm to 1700 nm are respectively +2.7 ps/nm/km, 3.0 ps/nm/km, +5.7 ps/nm/km, and −4.1 ps/nm/km, so that the maximum of the absolute chromatic dispersion is 5.7 ps/nm/km. Also, the chromatic dispersion is +5.0 ps/nm/km at 1500 nm, and +5.6 ps/nm/km at 1600 nm. The average, standard deviation, maximum and minimum of the chromatic dispersion over a wavelength range of 1500 nm to 1600 nm are +5.4 ps/nm/km, 0.2 ps/nm/km, +5.7 ps/nm/km, and +5.0 ps/nm/km, so that the maximum of the absolute chromatic dispersion is 5.7 ps/nm/km.

FIG. 3 shows the effective core area of the fundamental mode of the optical fiber shown in FIG. 1. The effective core area is 2.9 $\mu m^2$ at a wavelength of 1200 nm, and 4.0 $\mu m^2$ at 1700 nm. The average, standard deviation, maximum and minimum of the effective core area over a wavelength range of 1200 nm to 1700 nm are respectively 3.4 $\mu m^2$, 0.3 $\mu m^2$, 4.0 $\mu m^2$, and 2.9 $\mu m^2$. Also, the effective core area is 3.6 $\mu m^2$ at 1500 nm, and 3.8 $\mu m^2$ at 1600 nm. The average, standard deviation, maximum, and minimum of the effective core area over a wavelength range of 1500 nm to 1600 nm are respectively 3.7 $\mu m^2$, 0.1 $\mu m^2$, 3.8 $\mu m^2$, and 3.6 $\mu m^2$.

Because the chromatic dispersion characteristic is small in absolute value and negligibly wavelength-dependent over a board wavelength range, supercontinuum generation over a broad wavelength range and with a high coherence, optical pulse reshaping with small distortion of the pulses, and optical parametric amplification over a broad wavelength range can be realized using this optical fiber.

Figure 4:
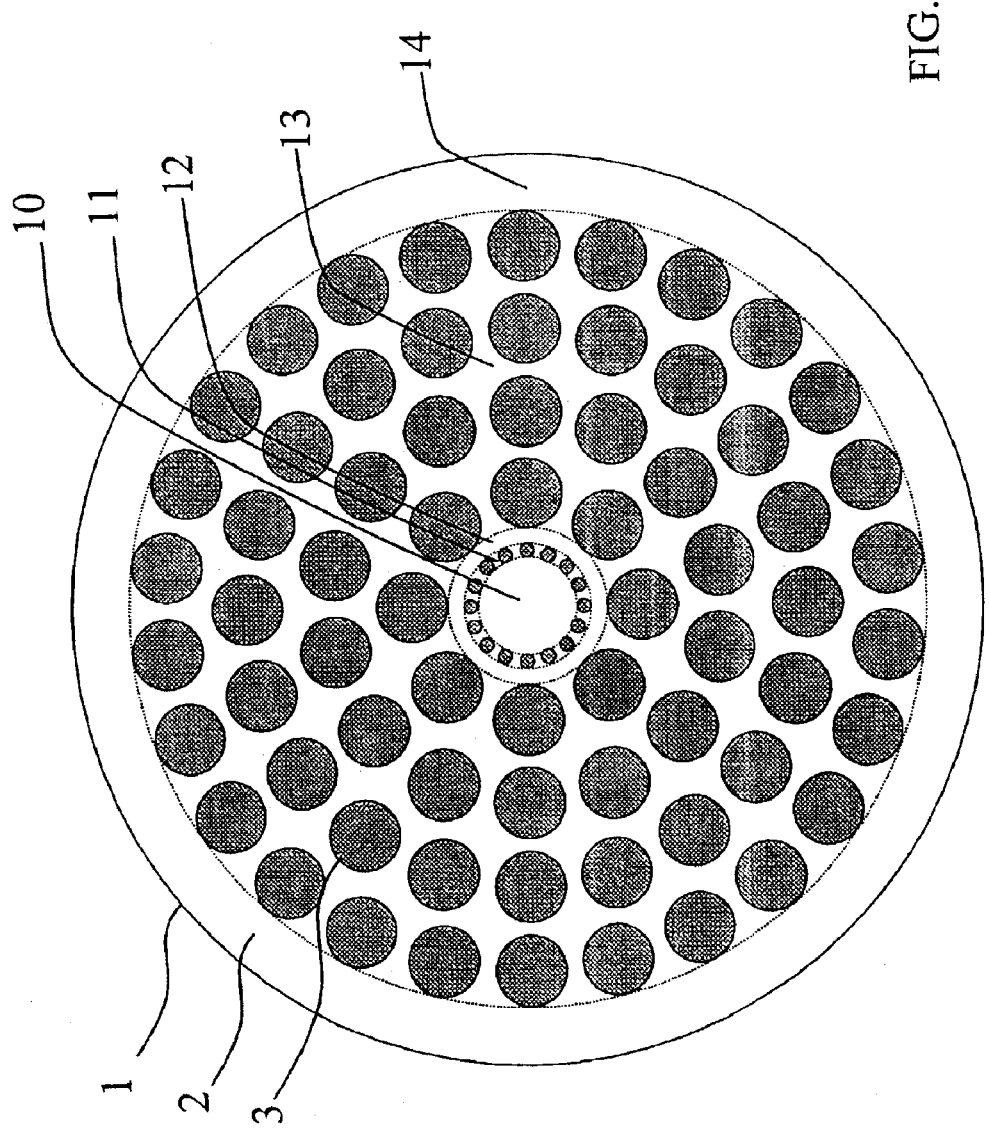
FIG. 4 is an illustration of a cross section taken perpendicular to the fiber axis of a microstructured optical fiber in accordance with another embodiment of the present invention.

FIG. 4 is an illustration of a cross section taken perpendicular to the fiber axis of a microstructured optical fiber in accordance with another embodiment of the present invention. Holes 3, which are sub media, are arranged in silica glass 2, which is a main medium. As in the first embodiment, although the silica glass is typically free from impurities, it is also possible to add dopants such as germanium, fluorine, chlorine, boron, aluminum, titanium, phosphorus, nitrogen, bismuth, erbium, ytterbium, neodymium, and praseodymium to the silica glass. Also, although the holes are typically filled with inert gases such as air, nitrogen gas, argon gas, neon gas, and helium gas, it is also possible to fill the holes with active gases such as hydrogen gas.

In the cross section shown in FIG. 4, the core region 10 is a circular region not including holes. The first cladding region 11 is a ring region surrounding the core region and including sixteen holes. The second cladding region 12 is a ring region surrounding the first cladding region and not including holes. The third cladding region 13 is a ring region surrounding the second cladding region and including sixty eight holes. The fourth cladding region 14 is a ring region surrounding the third cladding region and not including holes. The outer boundary of the fourth cladding region is the outer boundary of the glass region of the optical fiber. However, it is also possible to cover the outer surface of the fourth cladding region with coating materials such as polymer, and thereby to improve the mechanical strength of the optical fiber. The centers of the core and the first to fourth cladding regions coincide with the center of the optical fiber.

In the first cladding region, sixteen holes are arranged equidistantly on the circumference of the circle centered at the center of the optical fiber and having a radius of 1.24 $\mu$m. Each of the holes has a diameter of 0.31 $\mu$m, or equivalently an area of 0.08 $\mu m^2$. In the third cladding region, 8, 14, 20, and 26 holes are arranged equidistantly on the circumferences of the circles centered at the center of the optical fiber and having radii of 2.52 $\mu$m, 4.34 $\mu$m, 6.17 $\mu$m, and 8.00 $\mu$m, respectively. Each of the holes has a diameter of 1.54 $\mu$m. Because of this arrangement, the arrangement of the holes in the first cladding and the innermost layer of the third cladding region has a rotational symmetry of the fourth order.

The outer boundaries of the core and the first to the third cladding regions are circumferences of circles centered at the center of the optical fiber and having radii of 1.08 $\mu$m, 1.39 $\mu$m, 1.75 $\mu$m, and 8.77 $\mu$m, respectively. As a result, the average refractive indices of the core N[0] and the k-th cladding regions N[k] (k=1 . . . 4) are respectively N[0]= 1.444, N[1]=1.242, N[2]=1.444, N[3]=1.221, and N[4]= 1.444, and hence the condition of the above formula is satisfied. The refractive indices of silica glass and hole are respectively 1.444 and 1. The values of the refractive indices are defined at a 1550 nm wavelength unless designated otherwise.

FIG. 5 shows the chromatic dispersion of the fundamental mode of the optical fiber shown in FIG. 4. The chromatic dispersion is +14.3 ps/nm/km at a wavelength of 1200 nm, and +2.9 ps/nm/km at 1700 nm. The average, standard deviation, maximum and minimum of the chromatic dispersion over a wavelength range of 1200 nm to 1700 nm are respectively +5.5 ps/nm/km, 3.9 ps/nm/km, +14.3 ps/nm/km, and +1.9 ps/nm/km, so that the maximum of the absolute chromatic dispersion is 14.3 ps/nm/km. Also, the chromatic dispersion is +2.6 ps/nm/km at 1500 nm, and +2.0 ps/nm/km at 1600 nm. The average, standard deviation, maximum and minimum of the chromatic dispersion over a wavelength range of 1500 nm to 1600 nm are +2.2 ps/nm/km, 0.2 ps/nm/km, +2.6 ps/nm/km, and +2.0 ps/nm/km, so that the maximum of the absolute chromatic dispersion is 2.6 ps/nm/km.

FIG. 6(2a) shows the effective core area of the fundamental mode of the optical fiber shown in FIG. 4. The effective core area is 3.3 $\mu m^2$, at a wavelength of 1200 nm, and 4.7 $\mu m^2$, at 1700 nm. The average, standard deviation, maximum and minimum of the effective core area over a wavelength range of 1200 nm to 1700 nm are respectively 3.9 $\mu m^2$, 0.4 $\mu m^2$, 4.7 $\mu m^2$, and 3.3 $\mu m^2$. Also, the effective core area is 4.1 $\mu m^2$ at 1500 nm, and 4.4 $\mu m^2$ at 1600 nm. The average, standard deviation, maximum, and minimum of the effective core area over a wavelength range of 1500 nm to 1600 nm are respectively 4.2 $\mu m^2$, 0.1 $\mu m^2$, 4.4 $\mu m^2$, and 4.1 $\mu m^2$.

Because of this chromatic dispersion characteristic that is small in absolute value and negligibly wavelength-dependent over a board wavelength range, supercontinuum generation over a broad wavelength range and with a high coherence, optical pulse reshaping with small distortion of the pulses, and optical parametric amplification over a broad wavelength range can be realized using this optical fiber.

Figure 7:
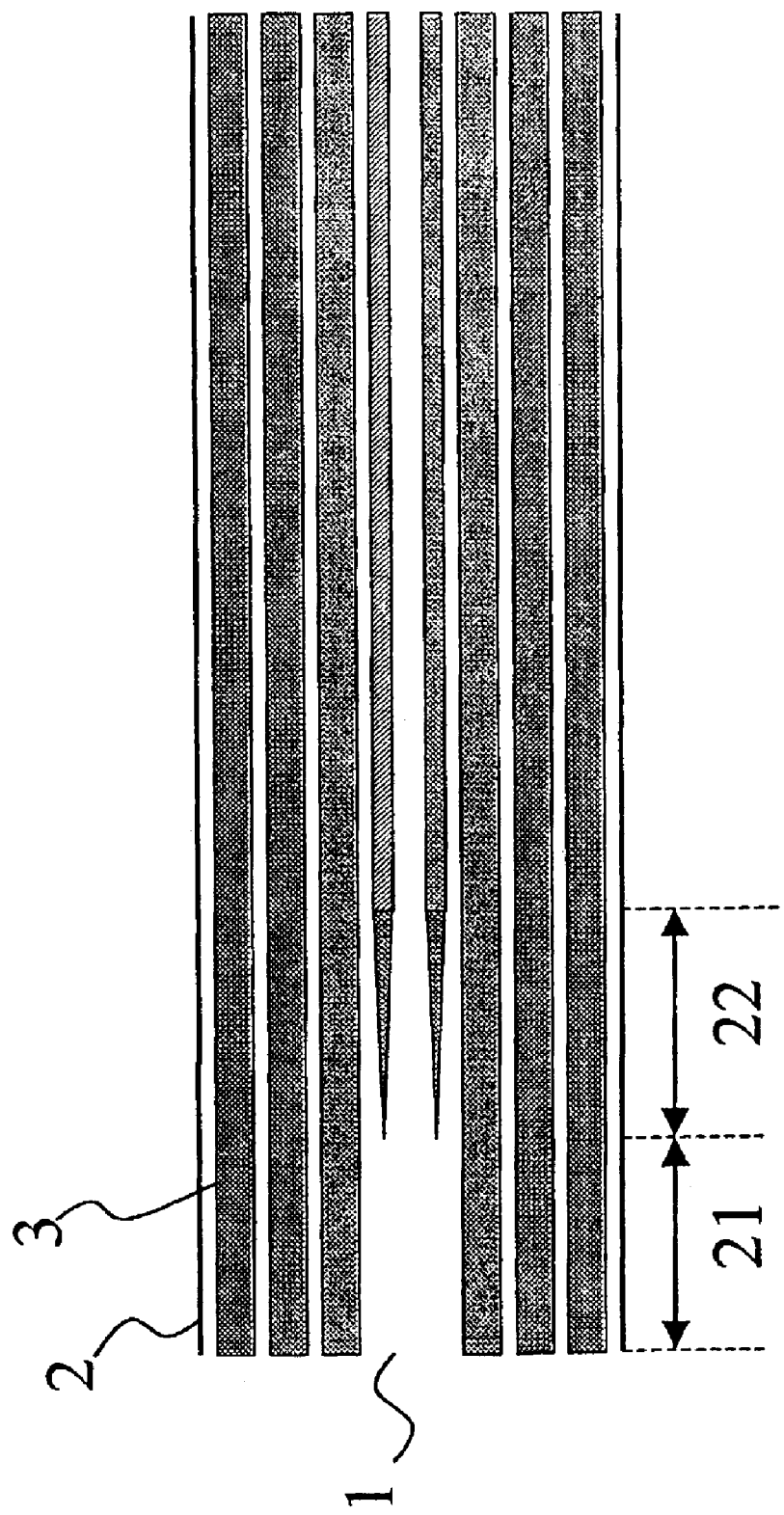
FIG. 7 is an illustration of a cross section taken along the fiber axis of a microstructured optical fiber in accordance with the present invention.

FIG. 6(2b) shows the effective core area of the optical fiber shown in FIG. 4 in the case the holes are replaced by silica glass. The ratio of the effective area after replacement to that before replacement is 2.0 at 1200 nm, and 1.6 at 1550 nm. Also, in the optical fiber shown in FIG. 4, the holes in the first cladding region have smaller diameter than those in the third cladding region, and hence higher surface tension. As a result, it is possible to collapse the holes in the first cladding selectively by keeping the optical fiber under a temperature at which shrinking of the holes due to surface tension takes place only in the first cladding. Such selective collapse is favorable because effective core area is enlarged while increase in the leakage loss due to weakened confinement does not occur. Especially, it is possible to enlarge the effective area in a fiber end by forming a section 21 where the holes in the first cladding region are collapsed and a section 22 where the diameters of the holes in the first cladding gradually change along the fiber length, as shown in FIG. 7.

Since the conventional single-mode fibers have effective core areas of above 10 to 80 $\mu m^2$ at 1550 nm wavelength, it has been difficult to realize a high coupling efficiency in an optical coupling between a conventional single-mode fiber and an optical fiber having an effective core area below 5 $\mu m^2$ at 1550 nm wavelength. However, it becomes easy to realize a high coupling efficiency in an optical coupling with a conventional single-mode fiber by employing the optical fiber of the present invention and enlarging the effective core area in a fiber end by selectively collapsing the holes in the first cladding as shown in FIG. 7. Also, by the present invention with enlarged effective core area in a fiber end, it also becomes easy to realize a high coupling efficiency in an optical coupling with external optical components because the requirement for the accuracy in positioning is relaxed.

Although the optical fibers of the embodiments of FIGS. 1 and 4 substantially have a rotational symmetry of the fourth order about the fiber center, it is also possible to make the order of rotational symmetry lower than three by making the intervals between the holes arranged on the circumferences uneven, and thereby to enhance the birefringence of the optical fiber and to improve the polarization maintaining property. As a result, it is possible to improve the efficiency of an optical parametric amplifier by stabilizing the states of polarization of the pump and the signal lightwaves and realizing a long interaction length.

The optical fiber of the above described embodiments can be fabricated as follows. First, four (or sixteen) holes having diameters of 1.5 mm and sixty eight holes having diameters of 4.2 mm (or 7.5 mm) are formed by drilling in a sintered glass column having a diameter of 60 mm. Second, the glass column is elongated to a diameter of 6 mm. Third, the elongated glass column is inserted into and merged with a glass tube with an inner diameter of about 6 mm and an outer diameter of 39 mm, resulting in an optical fiber preform. Finally, the preform is drawn into an optical fiber with a diameter of 106 $\mu m$ (or 80 $\mu m$). In this method, it is possible to lower the optical loss of the optical fiber due to absorption by impurities and scattering by surface roughness by etching the inner surfaces of the holes after the holes are formed by drilling. Compared with hole diameters as small as less than 1/6 to 1/10 of the wavelength (less than 0.16 $\mu m$ to 0.26 $\mu m$ at 1550 nm wavelength) in the above discussed prior art, the holes of the present invention are as large as 0.31 $\mu m$ to 0.41 $\mu m$. As a result, although it was necessary in the prior art to keep a low temperature in fiber drawing for controlling the diameters of the holes, it is possible in the present invention to enhance the drawing temperature, and thereby to realize a low optical loss, a high durability against UV light, and a high yield in fiber drawing. The prior art does not disclose the favorable characteristics of the present invention, which is a flat chromatic dispersion and a small effective core area.

FIG. 8 shows an optical module for supercontinuum generation using the optical fiber of either of the embodiments of the invention. The module has an optical fiber 1 wound in a diameter of 10 mm to 150 mm. At the fiber ends 31 and 32, the effective core area is enlarged by collapsing the holes in the first cladding region as shown in FIG. 7. At the fiber end 31, optical pulses from the pulsed light source 33 are coupled to the optical fiber. The optical pulses coupled at the fiber end 31 have a center wavelength in the range from 1200 nm to 1700 nm, a peak power of higher than 10 mW, and a duration less than 1 $\mu s$. As a result, the spectra of the pulses are broadened due to nonlinear optical effects in the optical fiber, and supercontinuum radiation emits from the fiber end 32. Since the optical fiber has small absolute chromatic dispersion that is negligibly wavelength-dependent over a broad wavelength range, and a small effective core area, it is possible to generate a supercontinuum radiation over a broad wavelength range and a high coherence. Also, since the coupling efficiency at the fiber ends is high, the efficiency of optical power is high.

FIG. 9 shows an optical module for optical pulse reshaping. The module has an optical fiber 1 of the present invention wound in a diameter of 10 mm to 150 mm. At the fiber ends 31 and 32, the effective core area is enlarged by collapsing the holes in the first cladding region as shown in FIG. 7. At the fiber end 31, optical signal pulses are input to the optical fiber. The input signal pulses have a center wavelength in the range from 1200 nm to 1700 nm, a peak power of higher than 10 mW, and a pulse duration less than 1 $\mu s$. Although optical signal pulses are accompanied by noise, the noise outside the signal bandwidth is filtered out before the signal is launched into the module. The spectra of the signal pulses are broadened due to nonlinear optical effects in the optical fiber, and then the signal passes a band-pass filter 35 having a center wavelength apart from that of the input signal. As a result, the noise is removed from the signal and the signal pulse is reshaped. Since the optical fiber has small chromatic dispersion in absolute value that is negligibly wavelength-dependent over a broad wavelength range, and has a small effective core area, it is possible to realize reshaping of optical pulses with little distortion of the pulses from modulational instability and other nonlinear effects. Also, since the coupling efficiency at the fiber ends is high, the efficiency of optical power is high.

FIG. 10 shows an optical module for optical parametric amplification. The module has an optical fiber 1 of the present invention wound in a diameter of 10 mm to 150 mm. At the fiber ends 31 and 32, the effective core area is enlarged by collapsing the holes in the first cladding region as shown in FIG. 7. At the port 43, an optical signal of a predetermined wavelength in the range from 1200 nm to 1700 nm is input. The optical source 44 generates a cw pump lightwave with a power higher than 10 mW. After the signal and the pump lightwaves are combined by a combining means 45, they are launched into the optical fiber. In the optical fiber, the optical power is transferred from the pump to the signal through the optical parametric process, so that the signal is amplified and emits from the fiber end 32. Since the optical fiber has small chromatic dispersion in absolute value, is negligibly wavelength-dependent over a broad wavelength range, and has a small effective core area, it is possible to realize an optical parametric amplification over a broad wavelength and with a high efficiency. Also, since the coupling efficiency at the fiber ends is high, the efficiency of optical power is high.

Figure 11:
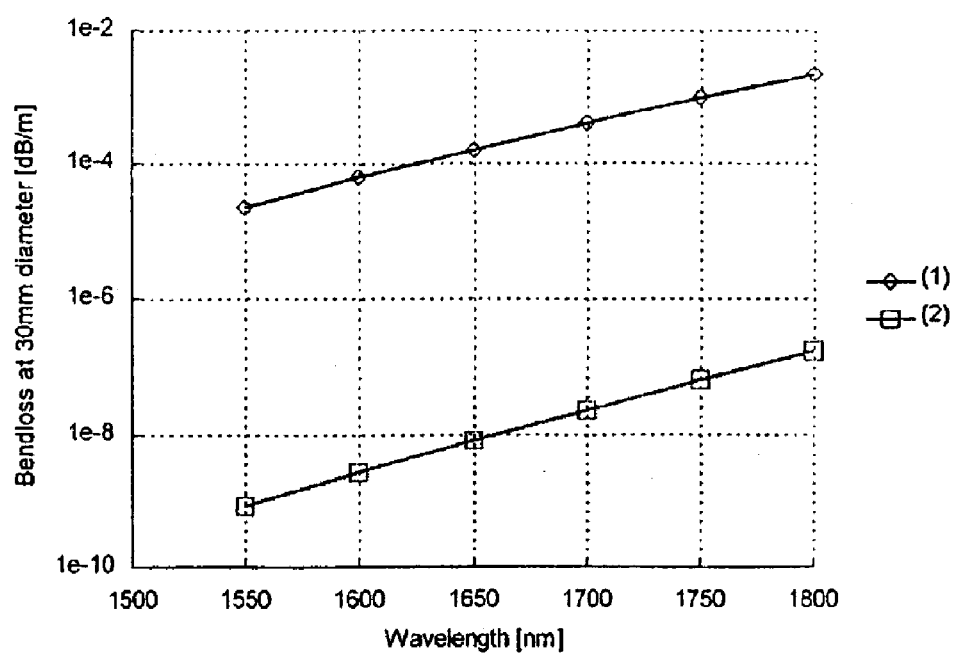
FIG. 11 is a graph showing the bending losses of the optical fibers of fiber embodiments of the present invention at a wavelength of 1550 nm.

FIG. 11 shows the bending losses of the optical fibers (1) and (2) of the two fiber embodiments in FIGS. 1 and 4, respectively. As shown therein, the optical fibers of the present invention have a low bending loss at a bending diameter of 30 mm, so that it is preferable for reducing the volume of the optical module to wind the optical fiber into a small diameter of less than 30 mm.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

What is claimed is:

1. An optical fiber comprising:

a core region and a plurality of cladding regions, a first cladding region surrounding the core region, and a (k+1)-th cladding region surrounding a k-th cladding region (k=1, 2, . . . ), wherein the first and the third cladding regions have a plurality of sub medium regions distributed in a main medium;

the sub medium has a lower refractive index than the main medium, the core, the k-th cladding regions (k=1, 2, 3), and the sub medium regions extend along the fiber length;

the average refractive indices of the core region N[0], and the k-th cladding regions N[k] (k=1, 2, 3) satisfies N[0]>N[1]<N[2]>N[3]; and the chromatic dispersion D($\lambda$) and the effective core area $A_{eff}(\lambda)$ of the fundamental mode satisfy $$\max_{\lambda \in \Omega}\{D(\lambda)\} - \min_{\lambda \in \Omega}\{D(\lambda)\} < 10[\text{ps/nm/km}],$$

$$\max_{\lambda \in \Omega}\{D(\lambda)\} < 20[\text{ps/nm/km}], \text{ and } \min_{\lambda \in \Omega}\{A_{eff}(\lambda)\} < 5[\mu m^2],$$

in a wavelength range $\Omega = \{\lambda | \lambda 1 <= \lambda <= \lambda 2\}$, where $\lambda 1 >= 1200$ [nm], $\lambda 2 <= 1700$ [nm], and $\lambda 2 - \lambda 1 >= 100$ [nm].

2. An optical fiber as recited in claim 1 wherein the main medium comprises silica glass and the sub regions comprise holes.

3. An optical fiber as recited in claim 1, wherein the core and the second cladding regions are composed of the main medium without sub medium regions.

4. An optical fiber as recited in claim 2 wherein the average cross sectional area of the holes in the first cladding region is greater than or equal to 0.06 $\mu m^2$.

5. An optical fiber as recited in claim 4 wherein the average cross sectional area of the holes in the first cladding region is greater than or equal to 0.10 $\mu m^2$.

6. An optical fiber as recited in claim 2 wherein the average cross sectional area of the holes in the first cladding region is smaller than the average cross sectional area of the holes in the third cladding region, and the effective core area of the fundamental mode at a predetermined wavelength $\lambda$ in said wavelength range $\Omega$ when the holes in the first cladding region are replaced by silica glass is greater than 1.5 times of the effective core area when the holes in the first cladding region are not replaced by silica glass.

7. An optical fiber as recited in claim 6, further comprising a collapsed section in at least one fiber end, wherein the holes in the first cladding region are collapsed and the holes in the third cladding region are not collapsed.

8. An optical fiber as recited in claim 4, further comprising a fourth cladding region surrounding the third cladding region, said fourth cladding region composed of only the main medium, and wherein the sub medium regions in the third cladding region are arranged equidistantly on circumferences on a plurality of circles centered at the center of the optical fiber.

9. An optical fiber as recited in claim 4, wherein the arrangement of the sub medium regions in the first cladding region has a rotational symmetry of higher than the second order about the center of the core region.

10. An optical fiber as recited in claim 4, wherein the order of the rotational symmetry of the arrangement of the sub medium regions in the first cladding region about the center of the core region is less than the third order.

11. An optical fiber wherein chromatic dispersion D($\lambda$) and effective core area $A_{eff}(\lambda)$ of the fundamental mode satisfy $$\max_{\lambda \in \Omega}\{D(\lambda)\} - \min_{\lambda \in \Omega}\{D(\lambda)\} < 10[\text{ps/nm/km}],$$

$$\max_{\lambda \in \Omega}\{D(\lambda)\} < 20[\text{ps/nm/km}], \text{ and } \min_{\lambda \in \Omega}\{A_{eff}(\lambda)\} < 5[\mu m^2],$$

in a wavelength range $\Omega = \{\lambda | \lambda 1 <= \lambda <= \lambda 2\}$, where $\lambda 1 >= 1200$ [nm], $\lambda 2 <= 1700$ [nm], and $\lambda 2 - \lambda 1 >= 100$ [nm] are satisfied.

12. An optical module comprising:

an optical fiber wound in a predetermined diameter of less than 150 mm over one or more turns; and an optical coupling means that couples lightwave in a predetermined wavelength range $\Omega = \{\lambda | \lambda 1 <= \lambda <= \lambda 2\}$ within 1200 nm to 1700 nm to the both ends of the optical fiber; wherein the optical fiber has a core region, a first cladding region surrounding the core region, and the (k+1)-th cladding region surrounding the k-th cladding region (k=1, 2), where the first and the third cladding regions have a plurality of sub medium regions in main medium, the sub medium has a lower refractive index than the main medium, the core, the k-th cladding regions (k=1, 2, 3), and the sub medium regions are extended along the fiber length;

the average refractive indices of the core region N[0], and the k-th cladding regions N[k] (k=1, 2, 3) satisfies N[0]>N[1]<N[2]>N[3]; and the chromatic dispersion D($\lambda$) and the effective core area $A_{eff}(\lambda)$ of the fundamental mode satisfy $$\max_{\lambda \in \Omega}\{D(\lambda)\} - \min_{\lambda \in \Omega}\{D(\lambda)\} < 10[\text{ps/nm/km}],$$

$$\max_{\lambda \in \Omega}\{D(\lambda)\} < 20[\text{ps/nm/km}], \text{ and } \min_{\lambda \in \Omega}\{A_{eff}(\lambda)\} < 5[\mu m^2],$$

in a wavelength range $\Omega = \{\lambda | \lambda 1 <= \lambda <= \lambda 2\}$, where $\lambda 1 >= 1200$ [nm], $\lambda 2 <= 1800$ [nm], and $\lambda 2 - \lambda 1 >= 100$ [nm] are satisfied.

13. An optical module as recited in claim 12, wherein the predetermined diameter in which the optical fiber is wound is less than 30 mm.

* * * * *